United States Patent
Spence (10) Patent No.: US 10,831,201 B2
(45) Date of Patent: Nov. 10, 2020

(54) REFUSE VEHICLE CONTROL SYSTEM AND METHOD OF CONTROLLING A REFUSE VEHICLE

(75) Inventor: William Jason Spence, Greensboro, NC (US)

(73) Assignee: VOLVO TRUCK CORPORATION, Gothenburg (SE)

(*) Notice: Subject to any disclaimer, the term of this patent is extended or adjusted under 35 U.S.C. 154(b) by 70 days.

(21) Appl. No.: 14/346,832

(22) PCT Filed: Oct. 10, 2011

(86) PCT No.: PCT/US2011/055587
§ 371 (c)(1),
(2), (4) Date: Mar. 24, 2014

(87) PCT Pub. No.: WO2013/055309
PCT Pub. Date: Apr. 18, 2013

(65) Prior Publication Data
US 2014/0236446 A1    Aug. 21, 2014

(51) Int. Cl.
*B65F 3/00* (2006.01)
*G05D 1/02* (2020.01)
(Continued)

(52) U.S. Cl.
CPC ........... *G05D 1/021* (2013.01); *B65F 1/1484* (2013.01); *B65F 3/00* (2013.01); *B65F 3/02* (2013.01);
(Continued)

(58) Field of Classification Search
CPC .. B61L 3/02; B61L 3/08; B61L 25/026; B65F 3/00; B65F 1/1484; B65F 3/02
(Continued)

(56) References Cited

U.S. PATENT DOCUMENTS

| 4,714,122 A * | 12/1987 | Appleton | .................. B65F 3/04 177/139 |
| 4,766,322 A * | 8/1988 | Hashimoto | ............ B25J 9/1015 250/559.33 |

(Continued)

FOREIGN PATENT DOCUMENTS

| DE | 29808379 U1 * | 12/1998 |
| EP | 963923 A2 * | 12/1999 |

(Continued)

OTHER PUBLICATIONS

A concept for infrastructure independent localization and augmented reality visualization of RFID tags; Kunkel, S. ; Bieber, R. ; Ming-Shih Huang ; Vossiek, M.; Wireless Sensing, Local Positioning, and RFID, 2009. IMWS 2009. IEEE MTT-S International Microwave Workshop on; DOI: 10.1109/IMWS2.2009.5307726; Publication Year: 2009 , pp. 1-4.*

(Continued)

*Primary Examiner* — Cuong H Nguyen
(74) *Attorney, Agent, or Firm* — Withrow & Terranova, PLLC (57) ABSTRACT

The present invention relates to a control system for a refuse vehicle and a method for controlling a refuse vehicle provided with at least one refuse container location sensor, at least one vehicle speed control, and one or more electronics. The one or more electronics receive and process signals from the at least one refuse container location sensor and outputs a control signal to the at least one vehicle speed control to stop the refuse vehicle at a predetermined location with respect to a refuse container.

16 Claims, 7 Drawing Sheets

(51) Int. Cl.
  *B65F 1/14* (2006.01)
  *B65F 3/02* (2006.01)
(52) U.S. Cl.
  CPC ......... *G05D 1/0246* (2013.01); *G05D 1/0257* (2013.01); *B65F 2210/168* (2013.01)
(58) Field of Classification Search
  USPC ............ 701/70, 99, 469; 340/681.1, 539.22; 901/31, 35; 414/405–406, 403, 408; 356/4.01
  See application file for complete search history.

(56) References Cited

U.S. PATENT DOCUMENTS

| | | | | |
|---|---|---|---|---|
| 5,007,786 | A | * | 4/1991 | Bingman .................. B65F 3/001 414/409 |
| 5,329,212 | A | | 7/1994 | Feigleson |
| 5,413,448 | A | | 5/1995 | Peshkin |
| 5,501,567 | A | * | 3/1996 | Lanzdorf .................. B60G 3/20 280/86.5 |
| 5,714,928 | A | * | 2/1998 | Sudo et al. .................... 340/436 |
| 5,762,461 | A | * | 6/1998 | Frohlingsdorf ....... B65F 1/1484 414/408 |
| 6,169,940 | B1 | * | 1/2001 | Jitsukata et al. ................. 701/23 |
| 6,311,120 | B1 | * | 10/2001 | Asada ............................. 701/96 |
| 6,648,576 | B1 | * | 11/2003 | Duell ...................... B65F 3/046 414/408 |
| 7,117,077 | B2 | * | 10/2006 | Michi et al. ..................... 701/96 |
| 7,725,225 | B2 | | 5/2010 | Pillar et al. |
| 10,358,057 | B2 | * | 7/2019 | Breed .................. G05D 1/0278 |
| 2002/0159870 | A1 | * | 10/2002 | Pruteanu ................ B65F 3/041 414/408 |
| 2003/0004644 | A1 | * | 1/2003 | Farmer ........................ 701/301 |
| 2003/0028323 | A1 | * | 2/2003 | Zeitler et al. ................. 701/219 |
| 2004/0056779 | A1 | * | 3/2004 | Rast ........................ B63B 22/16 340/985 |
| 2004/0133319 | A1 | | 7/2004 | Pillar et al. |
| 2005/0027809 | A1 | * | 2/2005 | Wakabayashi ................ 709/206 |
| 2005/0134440 | A1 | * | 6/2005 | Breed .................. B60N 2/2863 340/435 |
| 2006/0061481 | A1 | * | 3/2006 | Kurple et al. ............. 340/686.1 |
| 2007/0129849 | A1 | * | 6/2007 | Zini ...................... G05D 1/0238 700/258 |
| 2007/0173987 | A1 | | 7/2007 | Rowe et al. |
| 2008/0027599 | A1 | * | 1/2008 | Logan .................. G05D 1/0261 701/23 |
| 2008/0040005 | A1 | * | 2/2008 | Breed .................. H01H 35/146 701/48 |
| 2008/0046150 | A1 | * | 2/2008 | Breed ............................. 701/45 |
| 2009/0303035 | A1 | * | 12/2009 | Kirtley, Jr. ............ B66F 9/0755 340/539.11 |
| 2010/0039291 | A1 | * | 2/2010 | Harrison ................ G08G 1/005 340/928 |
| 2010/0114405 | A1 | | 5/2010 | Elston et al. |
| 2010/0234990 | A1 | * | 9/2010 | Zini ...................... G05D 1/0274 700/245 |
| 2010/0234991 | A1 | * | 9/2010 | Zini ........................ G05D 1/028 700/248 |
| 2011/0137457 | A1 | * | 6/2011 | Zini ...................... G05D 1/0246 700/245 |
| 2011/0184621 | A1 | * | 7/2011 | Bock ........................ B61L 3/008 701/70 |
| 2011/0282581 | A1 | * | 11/2011 | Zeng ............................. 701/301 |
| 2011/0313609 | A1 | * | 12/2011 | Endo ................ G08G 1/096716 701/23 |
| 2013/0039728 | A1 | * | 2/2013 | Price ...................... B65F 3/043 414/408 |
| 2014/0095009 | A1 | * | 4/2014 | Oshima et al. ................. 701/23 |

FOREIGN PATENT DOCUMENTS

| | | |
|---|---|---|
| EP | 963923 B1 | 12/1999 |
| JP | 2003039975 A | 2/2003 |
| JP | 2008049917 A | 3/2008 |
| JP | 2008308025 A | 12/2008 |

OTHER PUBLICATIONS

RFID-based Location System for Forest Search and Rescue Missions; Mouatadid, S. ; Fatara, Z. ; Salih-Alj, Y.[ Intelligent Systems Modelling & Simulation (ISMS), 2013 4th International Conference on; DOI: 10.1109/ISMS.2013.18; Publication Year: 2013 , pp. 439-444.*

RF vision: RFID receive signal strength indicator (RSSI) images for sensor fusion and mobile manipulation; Deyle, T. ; Nguyen, H. ; Reynolds, M. ; Kemp, C.C.; Intelligent Robots and Systems, 2009. IROS 2009. IEEE/RSJ International Conference on DOI: 10.1109/IROS.2009.5354047; Publication Year: 2009 , pp. 5553-5560.*

Design of an FPGA based intelligence traffic light controller with VHDL; Nath, S. ; Pal, C. ; Sau, S. ; Mukherjee, S. ; Roy, A. ; Guchhait, A. ; Kandar, D.; Radar, Communication and Computing (ICRCC), 2012 International Conference on DOI: 10.1109/ICRCC.2012.6450554; Publication Year: 2012 , pp. 92-97.*

Analysis with ADAMS/ANSYS on Dynamic Properties of Rotating Hook-Lift Garbage Truck; Guanglin Shi; Shuxun Chen; Guangmin Liang; Measuring Technology and Mechatronics Automation, 2009. ICMTMA '09. International Conference on Year: 2009, vol. 2; pp. 746-749, DOI: 10.1109/ICMTMA.2009.528.*

Location-based energy management optimization for hybrid hydraulic vehicles; Bender, F.A.; Kaszynski, M.; Sawodny, O. American Control Conference (ACC), 2013; Year: 2013; pp. 402-407, DOI: 10.1109/ACC.2013.6579870.*

Optimal Path Planning Simulator for Garbage Trucks; Kobayashi, T.; Murakoshi, H.; Mori, Y.; Ishijima, S.; SICE-ICASE, 2006. International Joint Conference; Year: 2006; pp. 488-491, DOI: 10.1109/SICE.2006.315476.*

Development of pneumatically automatic mechanical transmission for a pure electric garbage truck; Guangming Xiong; Junqiang Xi; Yong Zhai; Yuhui Hu; Yang Yu; Huiyan Chen; Industrial Technology (ICIT), 2010 IEEE International Conference on; Year: 2010 pp. 1108-1112, DOI: 10.1109/ICIT.2010.5472582.*

LOCO GPSI: preserve the GPS advantage for defense and security; K. Simonsen; M. Suycott; R. Crumplar; J. Wohlfiel IEEE Aerospace and Electronic Systems Magazine; Year: 2004, vol. 19, Issue: 12 pp. 3-7, DOI: 10.1109/MAES.2004.1374060.*

Smart Tracker: Light Weight Infrastructure-less Assets Tracking solution for Ubiquitous Computing Environment; N. Talukder; S. I. Ahamed; R. M. Abid; Mobile and Ubiquitous Systems: Networking & Services, 2007. MobiQuitous 2007. Fourth Annual International Conference on; Year: 2007; pp. 1-8, DOI: 10.1109/MOBIQ.2007.4451037.*

Framework of vehicle emission inspection and control through RFID and traffic lights; Chi-Man Vong ; Pak-Kin Wong ; Weng-Fai Ip; Proceedings 2011 International Conference on System Science and Engineering, Conference Paper; Publisher: IEEE (Year: 2011).*

Radio Frequency Identification (RFID) Based Toll Collection System; Atif Ali Khan ; Adnan I. Elberjaoui Yakzan ; Maaruf Ali; 2011 Third International Conference on Computational Intelligence, Communication Systems and Networks; Conference Paper, Publisher: IEEE (Year: 2011).*

Design and Realization of 2.45GHz Active RFID System; Yanpeng Sun ; Yuan Zhang ; Peng Peng; 2009 Second International Conference on Intelligent Computation Technology and Automation; Year: 2009 | vol. 1 | Conference Paper | Publisher: IEEE (Year: 2009).*

Performance analysis of speed detection in Bus Detection Devices (BDD); Mohd Zikrul Hakim bin Noor ; Mohammad Farid bin Saaid ; Ismarani binti Ismail; 2012 IEEE 8th International Colloquium on Signal Processing and its Applications (Year: 2012).*

International Search Report and Written Opinion of corresponding PCT application PCT/US2011/055587.

(56) References Cited

OTHER PUBLICATIONS

Translated Office Action of corresponding Japan application No. 2014-535694 dated Apr. 21, 2015.

* cited by examiner

REFUSE VEHICLE CONTROL SYSTEM AND METHOD OF CONTROLLING A REFUSE VEHICLE

FIELD OF THE INVENTION

The present invention relates to a control system for a refuse vehicle and a method of controlling a refuse vehicle.

BACKGROUND OF THE INVENTION

Refuse vehicles are commonly used for empting refuse containers, such as dumpsters and curbside cans. For example, a refuse vehicle may stop at each residence in a residential neighborhood and collect refuse from curbside cans or may collect refuse from dumpsters located at construction sites or businesses. Common practices for unloading the refuse containers include manually dumping the refuse container into the refuse vehicle or using a work tool on the truck to lift and dump the refuse container.

It is highly desirable to unload the refuse containers in manner that is most efficient. In connection with this, the rate at which refuse containers may be unloaded may be adversely affected due to improper positioning of the refuse vehicle with respect to the refuse container. For example, in manual operations, greater loading efficiency can be achieved by stopping the refuse vehicle at a position that minimizes the distance traveled by a worker who manually empties the refuse containers into the refuse vehicle.

Similar problems may be encountered when trying to optimally position refuse vehicles with a variety of types of work tools. By way of another example, on refuse vehicles provided with a work tool in the form of an automated side loading arm that grabs and picks up refuse containers, before the automated side loading arm can grab and pick up a refuse container, the driver must properly position the refuse vehicle in relation to the refuse container. Additionally, even if the refuse vehicle is positioned so that the arm may grab the refuse container, the amount of time required to position the arm to grab the refuse container may be decreased if the refuse vehicle is optimally positioned. Properly or optimally positioning the refuse vehicle may be difficult to achieve depending on the skill of the driver, especially OR refuse vehicles that are driven from a side of the refuse vehicle that is opposite the side loading arm.

The present invention is directed to a refuse vehicle control system and method of controlling a refuse vehicle that senses the location of a refuse container and stops the refuse vehicle at a predetermine position with respect to the refuse container.

SUMMARY OF THE INVENTION

According to one embodiment of the present invention, a control system for a refuse vehicle comprises at least one refuse container location sensor, at least one vehicle speed control, and one or more electronics. The one or more electronics receive and process signals from the at least one refuse container location sensor and output a control signal to the at least one speed control to stop the refuse vehicle at a predetermined location with respect to a refuse container.

According to another embodiment of the present invention, a method for controlling a refuse vehicle provided with a control system that includes at least one refuse container location sensor, at least one vehicle speed control and one or more electronics comprises the steps of using the at least one refuse container location sensor to track a refuse container and provide output signals to the one or more electronics and using the one electronics to process the output signals and identify the presence of the refuse container, telemetrically measure the position of the refuse container with respect to a reference point on or alongside the vehicle, and output a control signal to the at least one speed control to stop the refuse vehicle at a is predetermined location with respect to the refuse container.

DETAILED DESCRIPTION OF THE INVENTION

Figure 1:
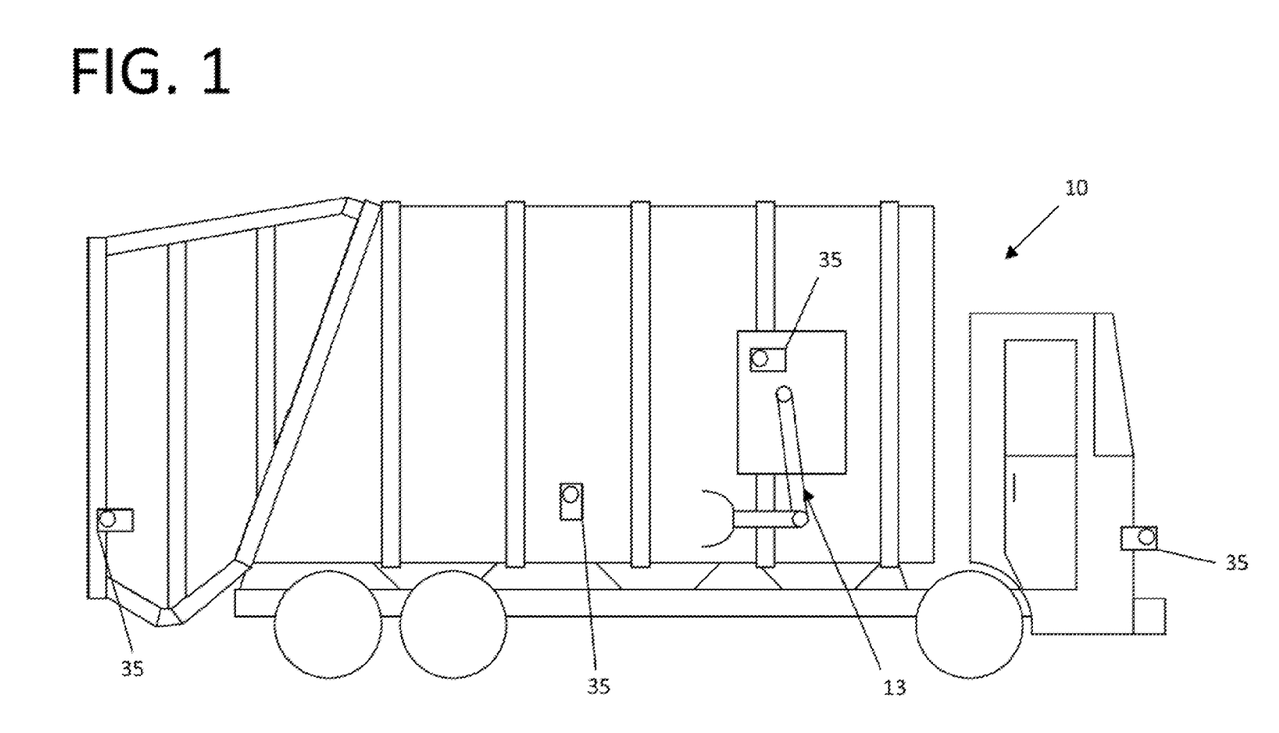
FIG. 1 depicts a side perspective view of a refuse vehicle according to one embodiment of the present invention.
Figure 2:
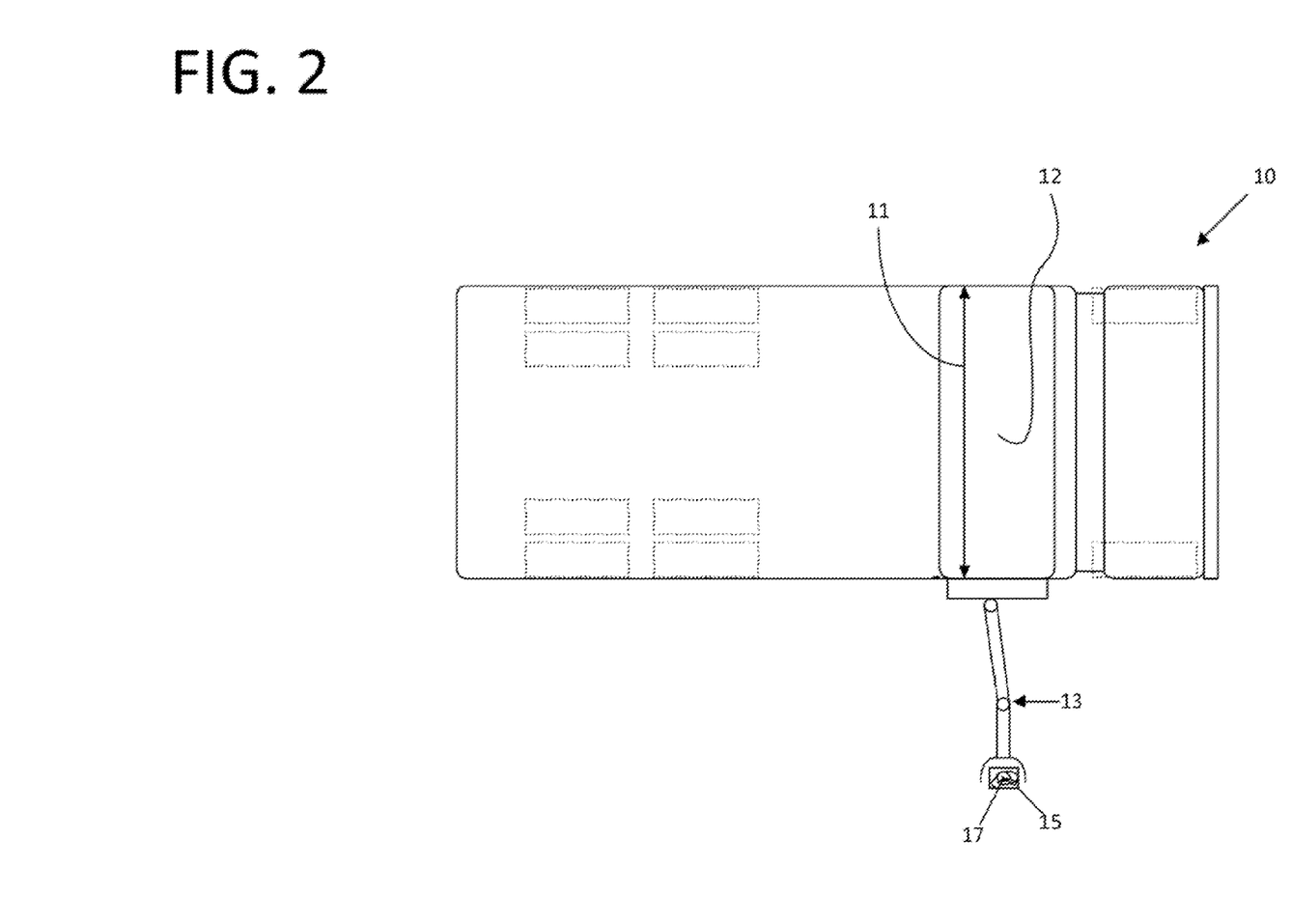
FIG. 2 depicts a top perspective view of a refuse vehicle according to one embodiment of the present invention.
Figure 3:
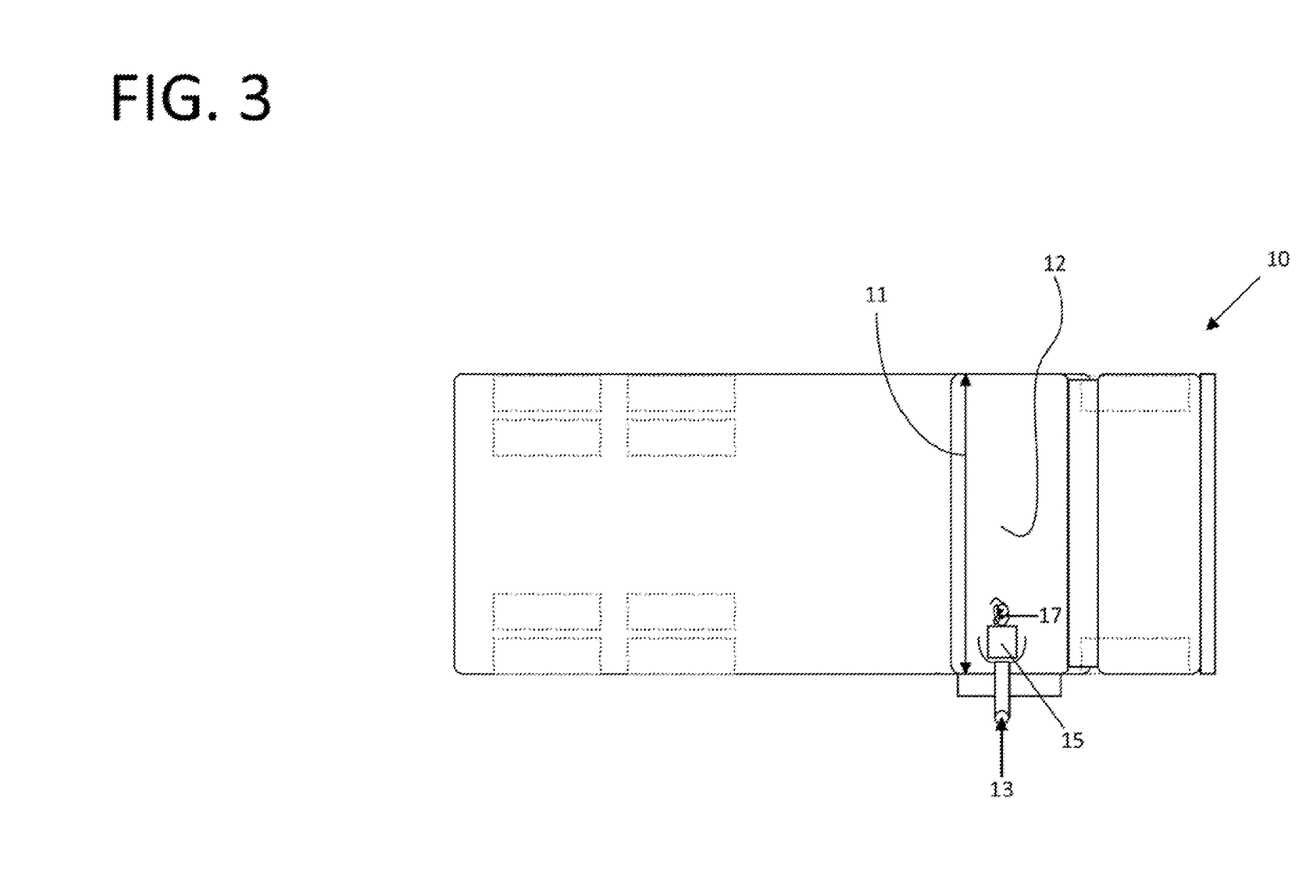
FIG. 3 depicts a top perspective view of a refuse vehicle according to one embodiment of the present invention.

FIG. 1-3 shows a refuse vehicle 10 according to one embodiment of the present invention. As shown in FIG. 2, the refuse vehicle 10 includes an opening 1 that leads to a refuse collection area 12. Also shown, the refuse vehicle 10 may include a work tool 13, which in the present embodiment is in the firm of an arm for grabbing and picking up a refuse container 15, which in the present embodiment is shown as a refuse can. As FIGS. 2 and 3 shows, upon grabbing and picking up the refuse container 15, the arm may dump the refuse 17 into the collection area 12 via the opening 11. Those of ordinary skill in the art will appreciate that after being dumped in the collection area 12 of the refuse vehicle 10 that a compactor (not shown) may be used to compact the refuse 17.

According to one aspect of the present embodiment, the refuse vehicle 10 includes a control system 20 configured to assist an operator of the refuse vehicle 10 with stopping at a predetermined, location with respect to the refuse container 15. In the present embodiment, the predetermined location is selected so that the work tool 14 can grab and pick up the refuse container 15. In alternative embodiments, however, the predetermined location may be selected so that other types of work tools, such as, belt grabbers, can grabbers, forks, or arms, may pick up the refuse container 15. In still further embodiments, the predetermined location may be selected so that a worker can most efficiently manually dump the refuse container 15 into the refuse vehicle 10.

Figure 4:
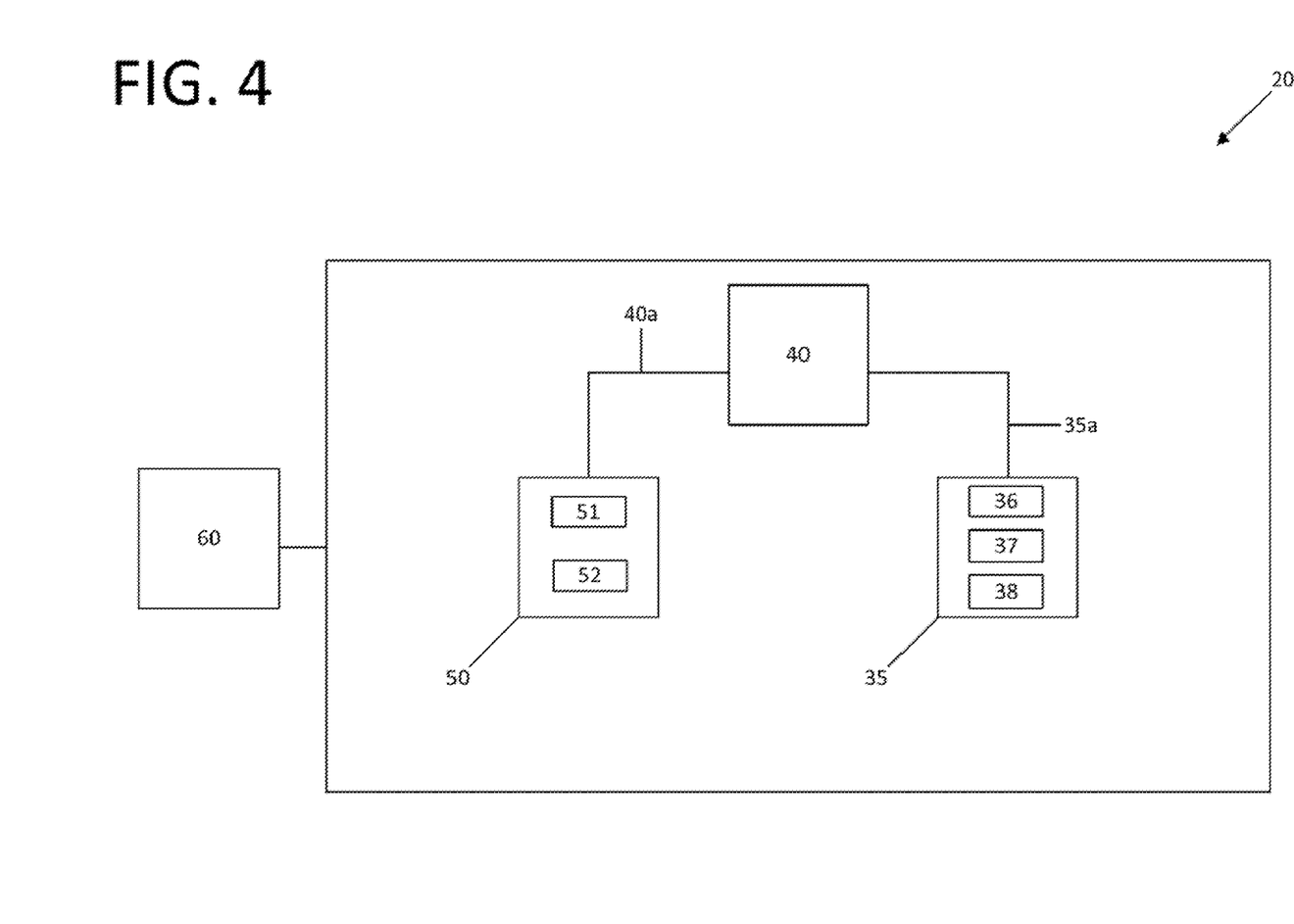
FIG. 4 depicts a schematic view of a control system according to one embodiment of the present invention.

Turning now to FIG. 4, a schematic of the control system 20 according to one embodiment is depicted. As shown, the control system 20 includes least one refuse container location sensor 35, one or more electronics 40, and at least one vehicle speed control 50.

According to another aspect of the present embodiment, the at least one refuse container location sensor 35 is configured to track the refuse container 15. As shown in FIG. 1, the refuse vehicle 10 may include a plurality of refuse container location sensors 35 positioned on the refuse vehicle 10. Those of ordinary skill in the art will appreciate that the at least one refuse container location sensor 35 may be located in any manner that allows refuse containers 15 to be tracked as the refuse vehicle 10 travels. Those of ordinary skill in the art will appreciate that it is within the scope of the present embodiment to provide one or more refuse container location sensors 35 that track the refuse container 15 by moving relative to the refuse vehicle 10 and/or one or more location sensors 35 that are stationary relative to the refuse vehicle 10. As shown in FIG. 4, the refuse container location sensors 35 may be in the form of cameras 36, RFID radar sensors 37, and/or laser sensors 38.

According to another aspect of the present embodiment, the one or more electronics 40 receive output signals 35a from the at least one refuse container location sensor 35. According to yet another aspect of the present embodiment, the one or more electronics 40 are configured to process signals from the at least one refuse container location sensor 35 and identify the presence of a refuse container 15. Those or ordinary skill in the at will appreciate that the refuse container 15 may be provided with one or more RFID tags and/or predetermined vision parameters, including, but not limited to visual markers on the refuse container 15, a profile of the refuse container 15 or a portion thereof, or various shapes and/or contours present on the refuse container 15, that the one or more electronics 40 identifies for purposes of identifying the presence of a refuse container 15.

According to another aspect of the present invention, upon identifying the presence of a refuse container 15, the one or more electronics 40 may telemetrically measure the position of the refuse container 15 with respect to a reference point A on or alongside the refuse vehicle 15. Those of ordinary skill in the art will appreciate that it is within the scope of the present embodiment for the one or more electronics 40 to continue to receive and process output signals 35a from the at least one refuse container location sensor 35 and continually telemetrically measure and monitor the position of the refuse container 15 with respect to a reference point A on or alongside the refuse vehicle 15, as the refuse vehicle 15 travels. Those of ordinary skill in the art will appreciate that empirical observations and testing may be used to correlate readings of the refuse container location sensor(s) 35, observations of the refuse container location sensor(s) 35, and/or output signals 35a with distances of the refuse container 15 with respect to a reference point A on or alongside the refuse vehicle 15 and that these correlations may be stored in a look up table accessible by the one or more electronics 40 for purposes of measuring and monitoring the position of the refuse container 15 with respect to a reference point A on or alongside the refuse vehicle 10.

According to another aspect of the present embodiment, the one or more electronics 40 are configured to stop the refuse vehicle 10 at a predetermined location with respect to the refuse container 15. According to yet another aspect of the present embodiment, the one or more electronics 40 are configured to output a control signal 40a to the vehicle speed control 50 to control the velocity, acceleration, and/or deceleration of the refuse vehicle 10, whereby the refuse vehicle 10 stops at a predetermined location with respect to the refuse container 15. Those of ordinary skill in the art will appreciate that empirical observations and testing may be used to correlate readings oldie refuse container location sensor(s) 35, observations of the refuse container location sensor(s) 35, output signals 35a, and/or calculated distances of the refuse container 15 with respect to a reference point A on or alongside the refuse vehicle 15 with the control signal 40a and/or velocity, acceleration, and/or deceleration of the refuse vehicle required to stop the refuse vehicle at a predetermined location with respect to the refuse container 15. These correlations may be stored in a look up table accessible by the one or more electronics 40 for purposes of stopping the refuse vehicle at a predetermined location with respect to the refuse container 15. Advantageously, the control signal 40a can be continuously updated and adjusted in real time in order to achieve a smooth and accurate stop.

As shown in FIG. 4, the vehicle speed control 50 may include a brake control Si and/or a throttle control 52. Although not shown, within the scope of the present invention, the vehicle speed control may also include a gear selector (not shown), Those of ordinary skill in the art will appreciate that the one or more electronics 40 may control the amplitude of brake force, via the brake control 51, and/or by controlling, via the throttle control 52, the engine power or torque output, that velocity, acceleration, and/or deceleration of the refuse vehicle 10 may be manipulated to cause the refuse vehicle 10 to stop at a predetermined location with respect to the refuse container 15.

Figure 5:
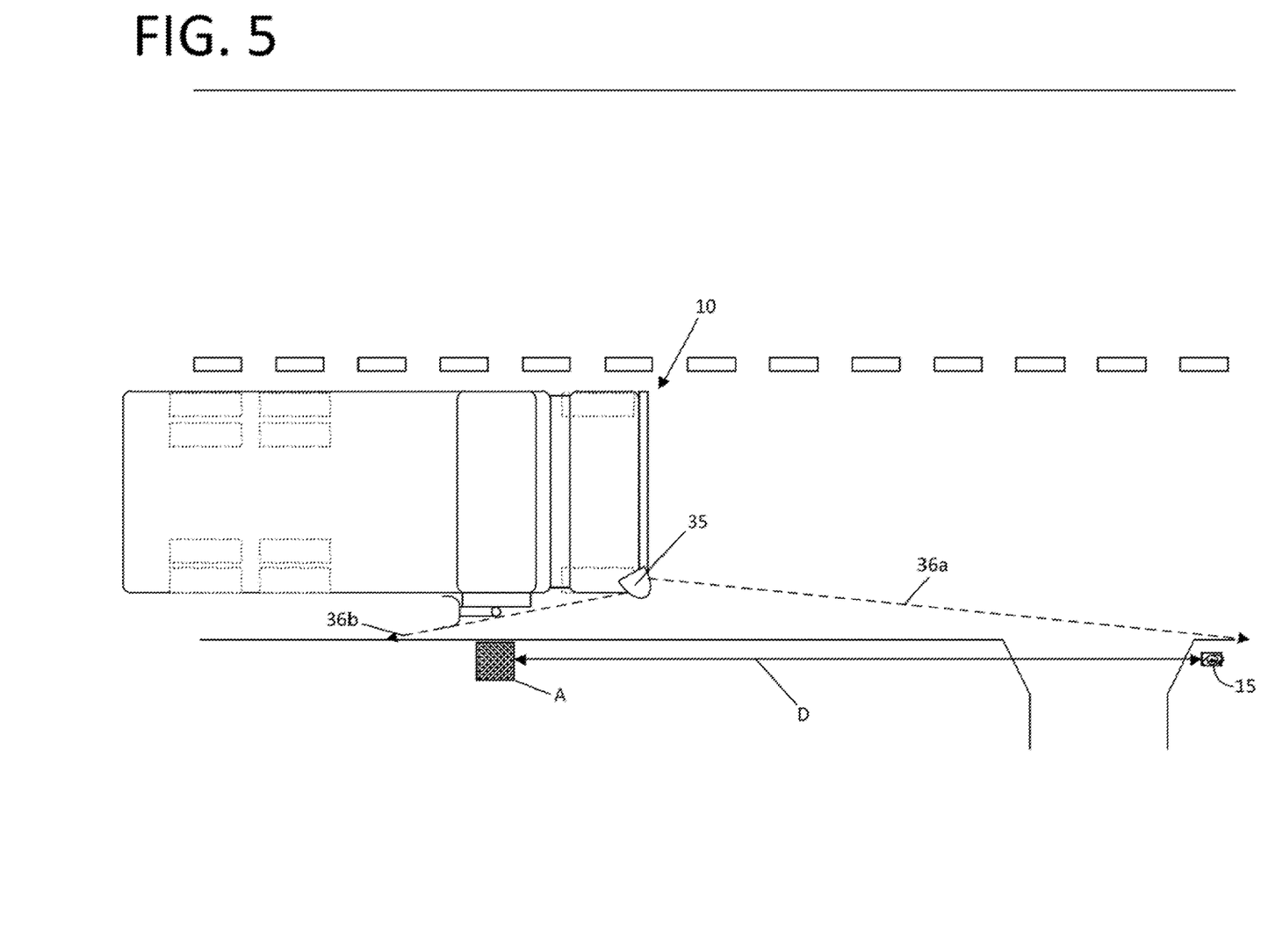
FIG. 5 depicts a top perspective view of a refuse vehicle in relation w a refuse container according to one embodiment of the present invention.

As shown in FIG. 5, as the refuse vehicle 10 travels and approaches a refuse container 15, the refuse container 15 will come within a sensing zone, as shown, for example, bounded by lines 35a, 35b, of a refuse container location sensor 35, which in the present embodiment is shown in the form of a video camera 36. Thereafter, the one or more electronics 35 will process output signals 35a from the camera 36 to identify the presence of the refuse container 15 using predetermined vision parameters, Those of ordinary skill in the art will appreciate that in the alternative or in addition to one or more cameras 36, one or more RFID radar sensors 37 and/or laser sensors may receive feedback from one or more RFID tags, which may be active, passive, or semi-active, or laser targets, provided on or embedded within the refuse container 15 and that the one or more electronics 40 may process a signal 35a from the one or more RFID radar sensors 37 or laser sensor 38 to identify the presence and location of the refuse container 15.

After the one or more electronics 40 identifying the presence of the refuse container 15, the one or more electronics will telemetrically measure and monitor the position of the refuse container 15 with respect to a reference point A on or alongside the refuse vehicle 10. For example, the one or more electronics 40 may telemetrically calculate or estimate the distance D between the refuse container and the reference point A, This may be achieved using signals from the camera 36. RFID radar sensor 37, and/or laser sensor 38. Additionally, or alternatively, within the scope of the present embodiment, a laser measuring tool (not shown) may be used to telemetrically calculate or estimate the distance.

Figure 6:
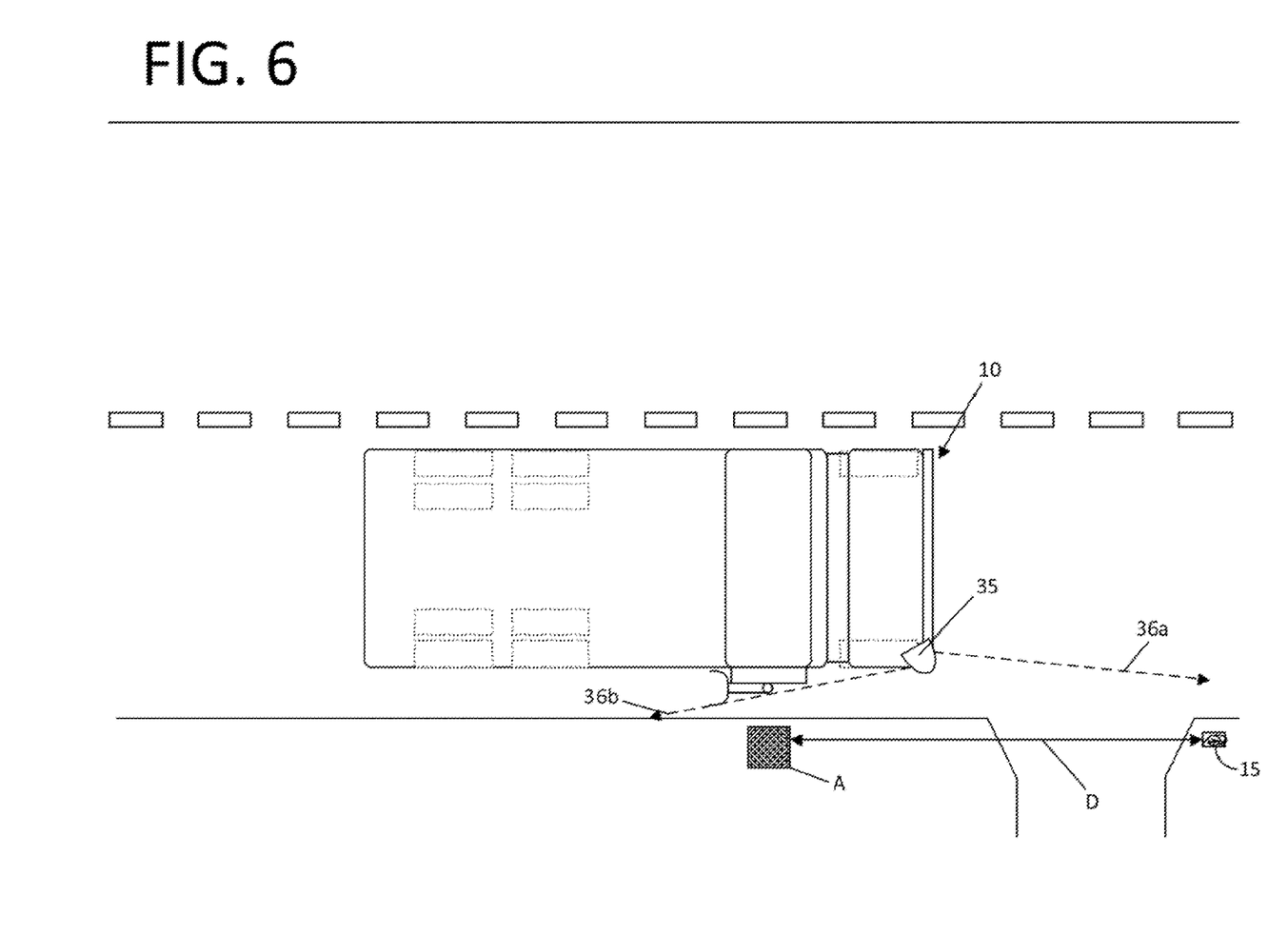
FIG. 6 depicts a top perspective view of a refuse vehicle in relation to a refuse container according to one embodiment oldie present invention.

As shown in FIG. 6, as the refuse vehicle 10 continues to travel towards the refuse container 15, the at least one refuse container sensor 35 may continue to track the refuse container 15 and the one or more electronics 40 may continually telemetrically measure and monitor the position of the refuse container 15 with respect to a reference point A on or alongside the refuse vehicle 15, as the refuse vehicle 15 travels.

Figure 7:
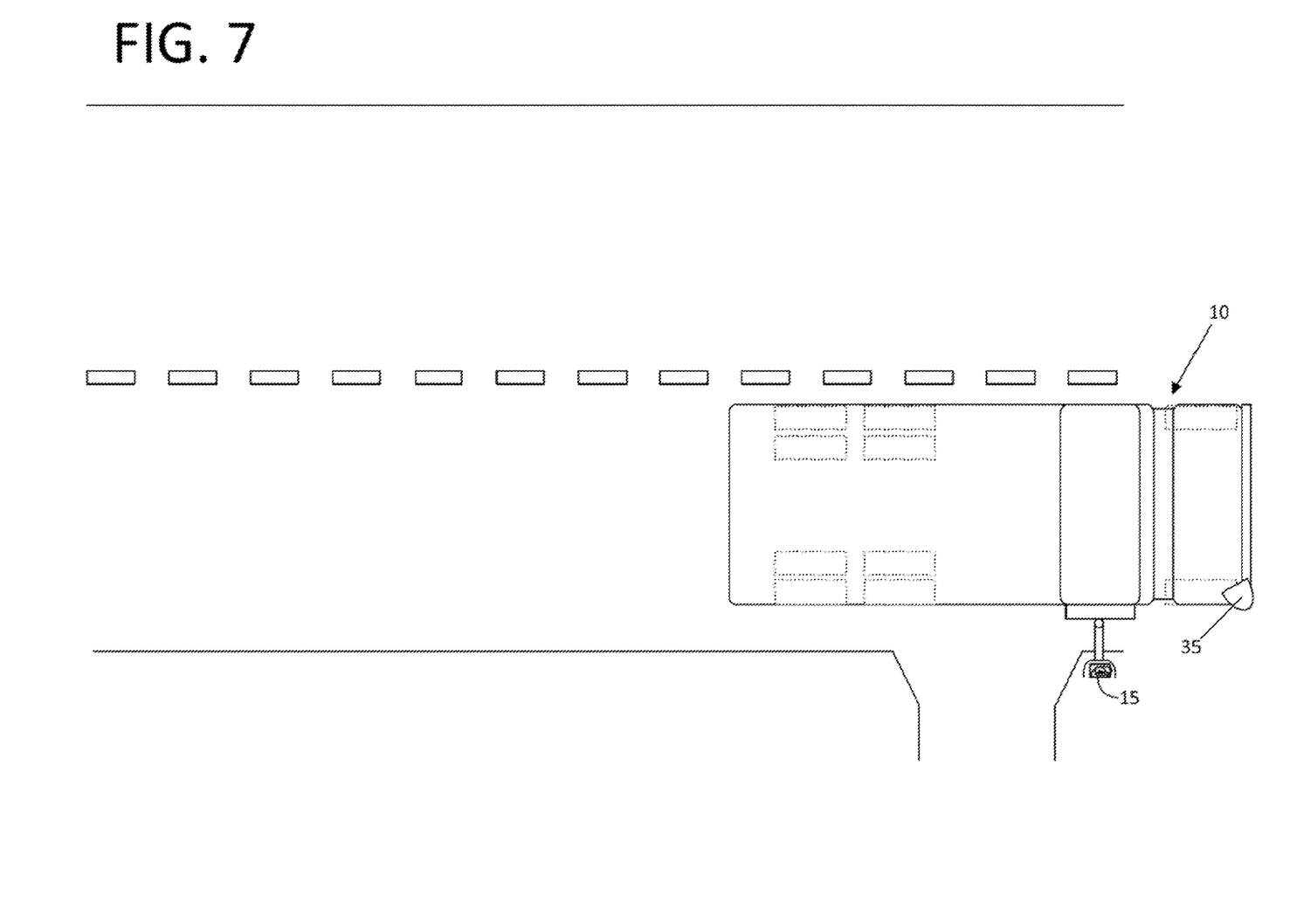
FIG. 7 depicts a top perspective view of a refuse vehicle in relation to a refuse container according to one embodiment of the present invention.

As shown in FIG. 7, as the refuse vehicle 10 continues to travel, eventually, and preferably gradually, the vehicle speed control 50 eventually stops the refuse vehicle 10 at a predetermined location with respect to the refuse container 15. As shown, in the present embodiment the predetermined location may be selected so that a work tool 14 may extend substantially perpendicular with respect to the refuse vehicle 10 and grab and subsequently pick up and unload the refuse container 15 into the refuse vehicle 10.

Advantageously, the control signal 40a preferably increases or decreases the intensity of deceleration or acceleration of the refuse vehicle 10 based on the location of the refuse container 15 with respect to the refuse vehicle 10 and the velocity of the refuse vehicle 10, which may be determined indirectly via the signals 35a and/or directly via a speed sensor (not shown). According to another aspect of the present embodiment, the control signal 40a should generate sufficient deceleration to completely stop the refuse vehicle 10 at the is predetermined location with respect to the refuse container 15. Within the scope of the present embodiment, this may take place with or without driver input.

Preferably, once the refuse vehicle is stopped, the control signal 40a maintains the refuse vehicle 10 at the predetermined, position until the operator initiates an override command, such as, for example, by pressing on an accelerator pedal (not shown) to cause the vehicle to accelerate. Alternatively, the control signal 40a may maintain the refuse vehicle at the predetermined position, until the refuse container 15 is unloaded and returned, to the ground, whereupon the control signal 40a may automatically cause the refuse vehicle 15 to accelerate for purpose of emptying a subsequent refuse container 15

According to another aspect of the present embodiment, a variety of safety measures may be incorporated into the control system 20. As an example, if the velocity of the refuse vehicle 10 exceeds a maximum speed limit, which may be determined by testing and empirical observations, that is too great to allow the refuse vehicle 10 to safely stop at the predetermined location with respect to the refuse container 15, the control signal 40a may allow or cause the refuse vehicle to overshoot the predetermined location. By way of another example, the control signal 40a may be overridden by the operator manually actuating a work brake or a parking brake. Additionally the operator's cabin may include a switch 60 that selectively activates and deactivates the control system 20.

The present description depicts specific examples to teach those skilled in the art how to make and use the best mode of the invention. For the purpose of teaching inventive principles, some conventional aspects have been simplified or omitted. The detailed descriptions of the above embodiments are not exhaustive descriptions of all embodiments contemplated by the inventors to be within the scope of the invention.

Those skilled in the art will appreciate variations from these examples that fall within the scope of the invention. Persons skilled in the an will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention. Thus, although specific embodiments of, and examples for, the invention are described herein for illustrative purposes, various equivalent modifications are possible within the scope of the invention, as those skilled in the relevant art will recognize. Accordingly, the scope of the invention is determined from the appended claims and equivalents thereof.

I claim:

1. A control system for a refuse vehicle provided with a work tool, comprising:
    at least one refuse container location sensor;
    at least one vehicle speed control; and
    one or more electronics that:
        receive and process signals from the at least one refuse container location sensor; and
        output a control signal to the at least one speed control to stop the refuse vehicle at a predetermined location whereat the work tool may pick up the refuse container.

2. The control system for a refuse vehicle according to claim 1, wherein the at least one speed control includes a brake.

3. The control system for a refuse vehicle according to claim 1, wherein the at least one speed control includes a throttle control.

4. The control system for a refuse vehicle according to claim 1, wherein the at least one refuse container location sensor includes a camera.

5. The control system for a refuse vehicle according to claim 1, wherein the at least one refuse container location sensor includes an RFID radar sensor.

6. The control system for a refuse vehicle according to claim 1, wherein the at least one refuse container location sensor includes a laser sensor.

7. The control system for a refuse vehicle according to claim 1, further comprising a switch that selectively activates and deactivates the operator assist system.

8. A method for controlling a refuse vehicle provided with a control system that includes at least one refuse container location sensor, at least one vehicle speed control and one or more electronics, comprising the steps of:
    using the at least one refuse container location sensor to track a refuse container and provide output signals to the one or more electronics;
    using the one electronics to:
        process the output signals and identify the presence of the refuse container; and
        output a control signal to the at least one speed control to stop the refuse vehicle at a predetermined location whereat the work tool may pick up the refuse container.

9. The method for controlling a refuse vehicle according to claim 8, wherein the at least one speed control includes a brake and wherein the step of outputting a control signal to the at least one speed control to cause the refuse vehicle to stop at a predetermined location with respect to the refuse container includes the step of outputting the control signal to the brake to cause the refuse vehicle to stop at a predetermined location with respect to the refuse container.

10. The method for controlling a refuse vehicle according to claim 8, wherein the at least one speed control includes a throttle control and wherein the step of outputting a control signal to the at least one speed control to cause the refuse vehicle to stop at a predetermined location with respect to the refuse container includes the step of outputting the control signal to the throttle control to cause the refuse vehicle to stop at a predetermined location with respect to the refuse container.

11. The method for controlling a refuse vehicle according to claim 8, wherein the at least one refuse container location sensor includes a camera.

12. The method for controlling a refuse vehicle according to claim 8, wherein the at least one refuse container location sensor includes an RFID radar sensor.

13. The method for controlling a refuse vehicle according to claim 8, wherein the at least one refuse container location sensor includes a laser sensor.

14. The method for controlling a refuse vehicle to claim 8, wherein the control system further includes a switch that selectively activates and deactivates the control system and further comprising the step of using the switch to selectively activate the control system.

15. The method for controlling a refuse vehicle according to claim 8, wherein the one or more electronics telemetrically measure the position of the refuse container with respect to a reference point on or alongside the vehicle.

16. The control system for a refuse vehicle according to claim 1, wherein the one or more electronics telemetrically measure the position of the refuse container with respect to a reference point on or alongside the vehicle.

\* \* \* \* \*